United States Patent
Anderson

(10) Patent No.: US 11,668,202 B2
(45) Date of Patent: Jun. 6, 2023

(54) AIRFOIL CORE INLETS IN A ROTATING VANE

(71) Applicant: UNITED TECHNOLOGIES CORPORATION, Farmington, CT (US)

(72) Inventor: Corey D. Anderson, East Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 701 days.

(21) Appl. No.: 16/055,761

(22) Filed: Aug. 6, 2018

(65) Prior Publication Data
US 2020/0040760 A1    Feb. 6, 2020

(51) Int. Cl.
*F01D 9/06* (2006.01)
*F01D 9/04* (2006.01)
*F01D 17/16* (2006.01)

(52) U.S. Cl.
CPC ............. *F01D 9/065* (2013.01); *F01D 9/041* (2013.01); *F01D 17/162* (2013.01); *F05D 2240/12* (2013.01); *F05D 2260/205* (2013.01)

(58) Field of Classification Search
CPC ........ F01D 9/065; F01D 17/162; F01D 5/189; F01D 5/187; F01D 5/188
See application file for complete search history.

(56) References Cited

U.S. PATENT DOCUMENTS

| | | | |
|---|---|---|---|
| 4,169,692 A | 10/1979 | McDonough et al. | |
| 4,193,738 A | 3/1980 | Landis, Jr. et al. | |
| 5,184,459 A | 2/1993 | McAndrews | |
| 9,670,797 B2* | 6/2017 | Slavens | F01D 5/187 |
| 10,030,538 B2* | 7/2018 | Hernandez | F01D 25/12 |
| 10,132,191 B2* | 11/2018 | Surace | F01D 17/162 |
| 10,598,191 B2* | 3/2020 | Scholtes | F01D 5/18 |
| 2016/0201491 A1 | 7/2016 | Surace et al. | |
| 2017/0328379 A1* | 11/2017 | Scholtes | F01D 25/02 |
| 2018/0135431 A1 | 5/2018 | Propheter-Hinckley | |

FOREIGN PATENT DOCUMENTS

| | | |
|---|---|---|
| EP | 2216508 | 8/2010 |
| WO | 2014052744 | 4/2014 |

OTHER PUBLICATIONS

European Patent Office, European Search Report dated Oct. 18, 2019 in Application No. 19189872.5.
European Patent Office, European Office Action dated Dec. 1, 2020 in Application No. 19189872.5.
European Patent Office; European Office Action dated Mar. 3, 2022 in Application No. 19189872.5.

* cited by examiner

*Primary Examiner* — Courtney D Heinle
*Assistant Examiner* — John S Hunter, Jr.
(74) *Attorney, Agent, or Firm* — Snell & Wilmer L.L.P.

(57) ABSTRACT

A component for a gas turbine engine includes an airfoil, including therein a first cavity and a second cavity, and an outer spindle extending from the airfoil, the outer spindle including a first channel in fluid communication with the first cavity and a second channel in fluid communication with the second cavity.

14 Claims, 8 Drawing Sheets

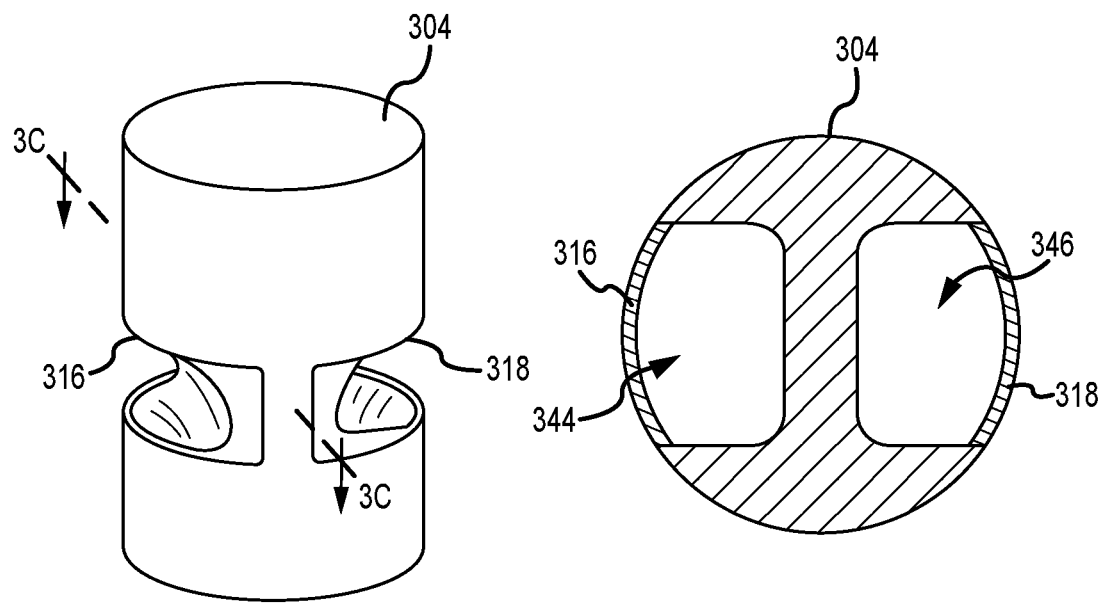
FIG.3B
FIG.3C
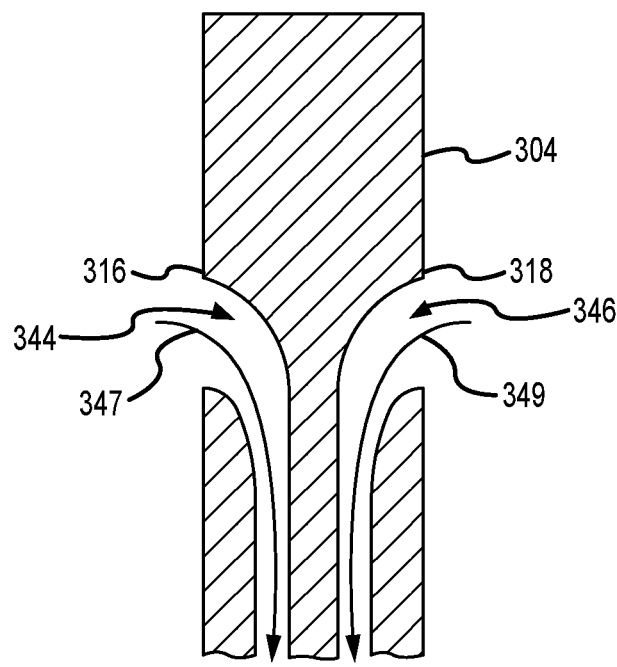
FIG.3D

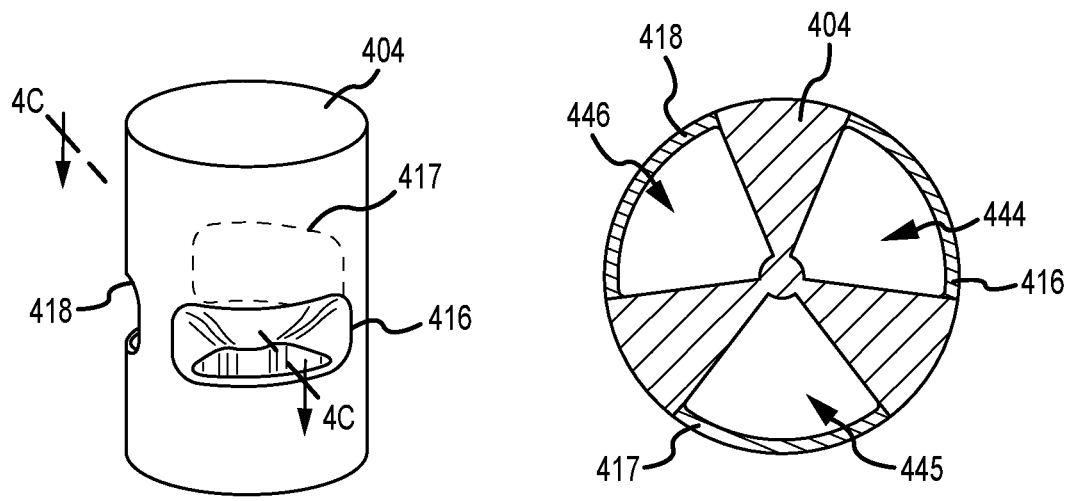
FIG.4B
FIG.4C
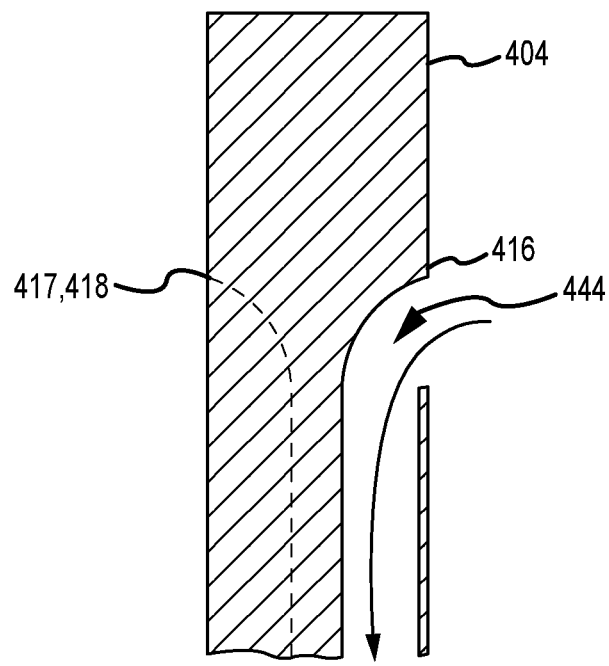
FIG.4D

AIRFOIL CORE INLETS IN A ROTATING VANE

FIELD

The present disclosure relates to gas turbine engines and, more particularly, to gas turbine engines having vanes with cooling passages therein.

BACKGROUND

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases in order to power the compressor and fan sections.

One or more sections of the gas turbine engine may include a plurality of vane assemblies having vanes interspersed between rotor assemblies that carry the blades of successive stages of the section. The vanes can be manufactured to a fixed flow area that is optimized for a single flight point. Alternatively, it is possible to alter the flow area between two adjacent vanes by providing one or more variable vanes that rotate about a given axis to vary the flow area. Whether the vanes are stationary or rotating, there are benefits to providing a cooling fluid to the interior of the vanes or to route the cooling fluid through the vanes to reach components or locations positioned radially inward of the vanes.

SUMMARY

A gas turbine engine component is disclosed. In various embodiments, the component includes an airfoil, including therein a first cavity and a second cavity, and an outer spindle extending from the airfoil, the outer spindle including a first channel in fluid communication with the first cavity and a second channel in fluid communication with the second cavity.

In various embodiments, the outer spindle includes at least one opening in fluid communication with the first channel and the second channel. In various embodiments, the outer spindle includes a first opening in fluid communication with the first channel and a second opening in fluid communication with the second channel. In various embodiments, the first cavity is in fluid communication with one or more trailing edge apertures disposed proximate a trailing edge of the airfoil. In various embodiments, the second cavity is in fluid communication with one or more leading edge apertures disposed proximate a leading edge of the airfoil.

In various embodiments, the airfoil further includes a third cavity and the outer spindle includes a third channel in fluid communication with the third cavity. In various embodiments, the outer spindle includes a third opening in fluid communication with the third channel. In various embodiments, the third cavity extends through the airfoil and exits through an inner spindle positioned opposite the airfoil of the outer spindle.

In various embodiments, at least one of the first cavity and the second cavity extends through the airfoil and exits through an inner spindle positioned opposite the airfoil of the outer spindle. In various embodiments, the airfoil is a vane, at least one opening is configured for fluid communication with a conduit configured to supply a cooling fluid flow, and the conduit includes a boundary comprising an outer platform, configured to receive the outer spindle, and an engine casing structure. In various embodiments, the vane is configured to rotate relative to the outer platform.

A stator assembly for a gas turbine engine is disclosed. In various embodiments, the stator assembly includes a plurality of vanes disposed circumferentially about an inner platform and an outer platform and an engine casing structure disposed radially outward of the outer platform and forming a conduit between the outer platform and the engine casing structure. A first vane includes a first outer spindle extending from the first vane and through the outer platform, the first outer spindle including a first channel in fluid communication with a first vane cavity and a second channel in fluid communication with a second vane cavity.

In various embodiments, the first outer spindle includes a first opening in fluid communication with the first channel and a second opening in fluid communication with the second channel. In various embodiments, the first vane cavity is in fluid communication with one or more trailing edge apertures disposed proximate a trailing edge of the first vane. In various embodiments, the second vane cavity is in fluid communication with one or more leading edge apertures disposed proximate a leading edge of the first vane.

In various embodiments, the first vane further includes a third vane cavity and the first outer spindle includes a third channel in fluid communication with the third vane cavity. In various embodiments, the first outer spindle includes a third opening in fluid communication with the third channel. In various embodiments, the third vane cavity extends through the first vane and exits through a first inner spindle positioned opposite the first vane of the first outer spindle.

In various embodiments, the stator assembly further includes a second vane having a second outer spindle extending from the second vane and through the outer platform, the second outer spindle including a third channel in fluid communication with a third vane cavity and a fourth channel in fluid communication with a fourth vane cavity, the second outer spindle including a third opening in fluid communication with the third channel and a fourth opening in fluid communication with the fourth channel.

A gas turbine engine is disclosed. In various embodiments, the gas turbine engine includes a rotor assembly and a stator assembly. The stator assembly includes a plurality of vanes disposed circumferentially about an inner platform and an outer platform. An engine casing structure is disposed radially outward of the outer platform and forms a conduit between the outer platform and the engine casing structure. A first vane includes a first outer spindle extending from the first vane and through the outer platform, the first outer spindle including a first channel in fluid communication with a first vane cavity and a second channel in fluid communication with a second vane cavity. The first outer spindle includes a first opening in fluid communication with the first channel and a second opening in fluid communication with the second channel.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 3A, 3B, 3C and 3D are schematic views of a vane, in accordance with various embodiments; and FIGS. 4A, 4B, 4C and 4D are schematic views of a vane, in accordance with various embodiments.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
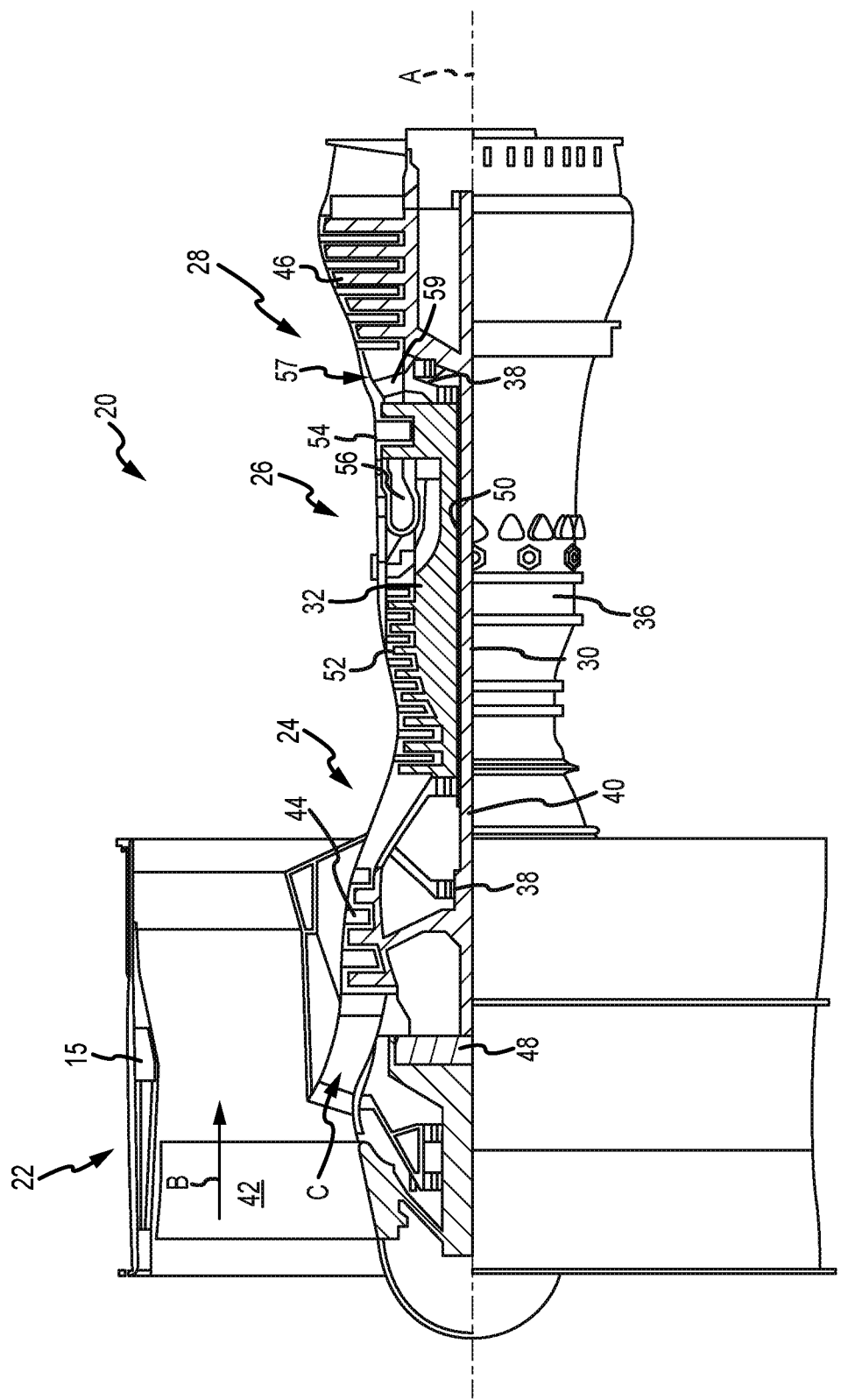
FIG. 1A is a schematic view of a gas turbine engine, in accordance with various embodiments.

Referring now to the drawings, FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core or primary flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 1B:
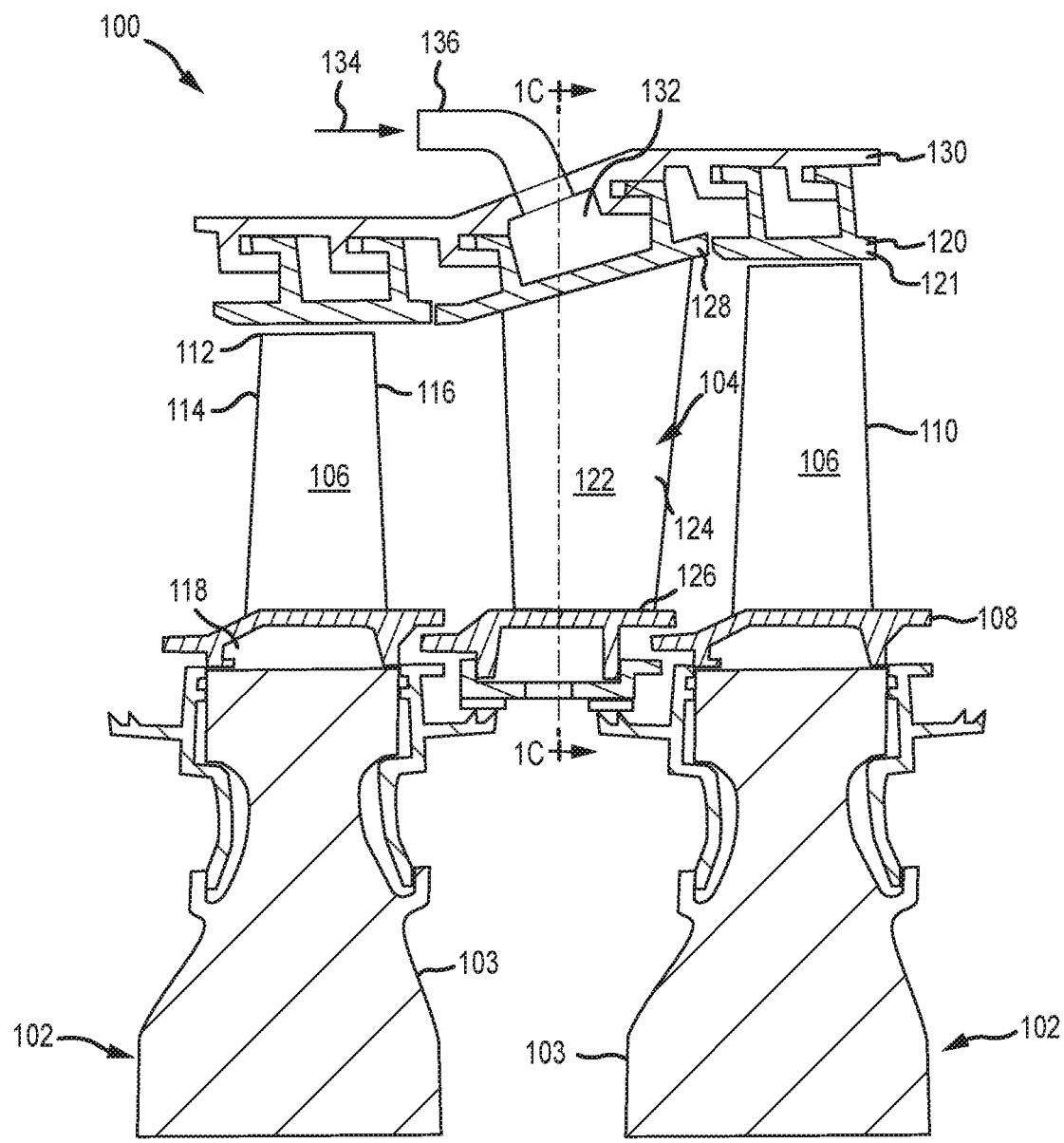
FIG. 1B is a schematic side view of a rotor and vane assembly of a gas turbine engine, in accordance with various embodiments.

Referring now to FIG. 1B, selected portions of a turbine section 100 of a gas turbine engine, such as, for example, the turbine section 28 described above with reference to FIG. 1A, are illustrated. The turbine section 100 includes alternating rows of rotor assemblies 102 and vane assemblies 104. Each of the rotor assemblies 102 carries one or more rotor blades 106 for rotation about a central axis A. Each of the rotor blades 106 includes a rotor platform 108 and an airfoil 110 extending in a radial direction R from the rotor platform 108 to a rotor tip 112. The airfoil 110 generally extends in a chord-wise direction X between a leading edge 114 and a trailing edge 116. A root section 118 of each of the rotor blades 106 is mounted to a rotor disk 103. The airfoil 110 can alternatively be integrally formed with the rotor disk 103, which is sometimes referred to as an integrally bladed rotor. A blade outer air seal (BOAS) 120 is disposed radially outward of the rotor tip 112 of the airfoil 110. The BOAS 120 includes a platform 121 configured to provide a seal to prevent hot gases from leaking outside the core airflow path C (see FIG. 1).

Each of the vane assemblies 104 includes one or more vanes 122 positioned along the engine axis A and adjacent to one or more rotor blades 106. Each of the vanes 122 includes an airfoil 124 extending between an inner vane platform 126 and an outer vane platform 128. The vane assemblies 104 are connected to an engine casing structure 130. The BOAS 120 and the vane assemblies 104 may be disposed radially inward of the engine casing structure 130. In various embodiments, one or both of the BOAS 120 and the vane assemblies 104 may include full annular platforms or they may be segmented and include feather seals between segments to help prevent leakage of cooling fluid between the segments. In various embodiments, one or more of the vanes 122 may be configured to rotate about an axis extending between the inner vane platform 126 and the outer vane platform 128.

Figure 1C:
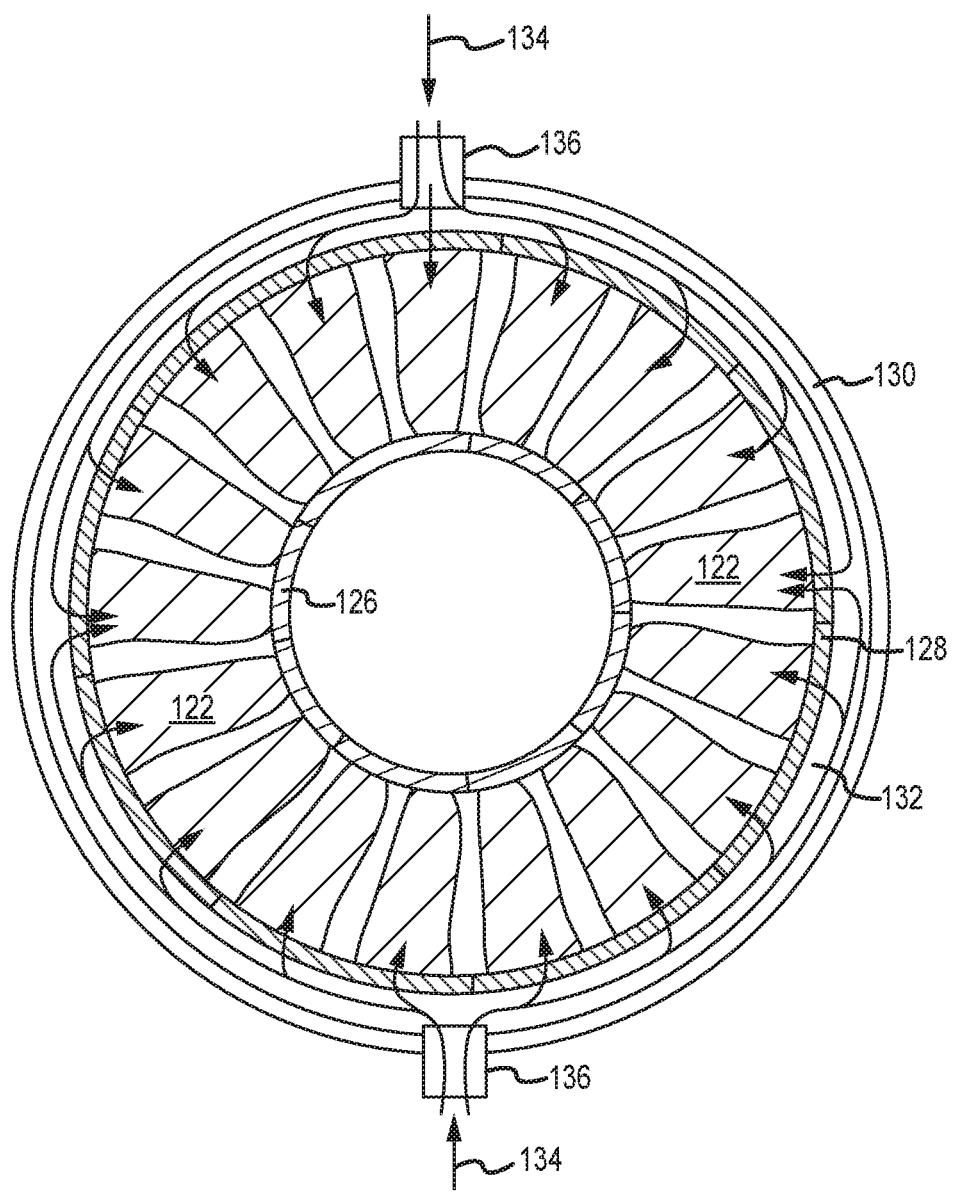
FIG. 1C is a schematic axial view of a vane assembly of a gas turbine engine, in accordance with various embodiments.

Referring to FIG. 1C, a sectional view along the line 1C-1C in FIG. 1B is shown. The engine casing structure 130 extends circumferentially about the central axis A, as illustrated in FIG. 1B. Radially inward of the engine casing structure 130 is the outer vane platform 128 and the inner vane platform 126. The engine casing structure 130 and the outer vane platform 128 provide a conduit 132 within which a supply of cooling air 134 may be provided to the one or more vanes 122. In various embodiments, one or more inlets 136 are spaced circumferentially about the engine casing structure 130 and configured to route the supply of cooling air 134 into the conduit 132. The supply of cooling air 134 then flows about the conduit 132 and enters the one or more vanes 122 before being further routed throughout the vanes for cooling purposes.

Figure 2A:
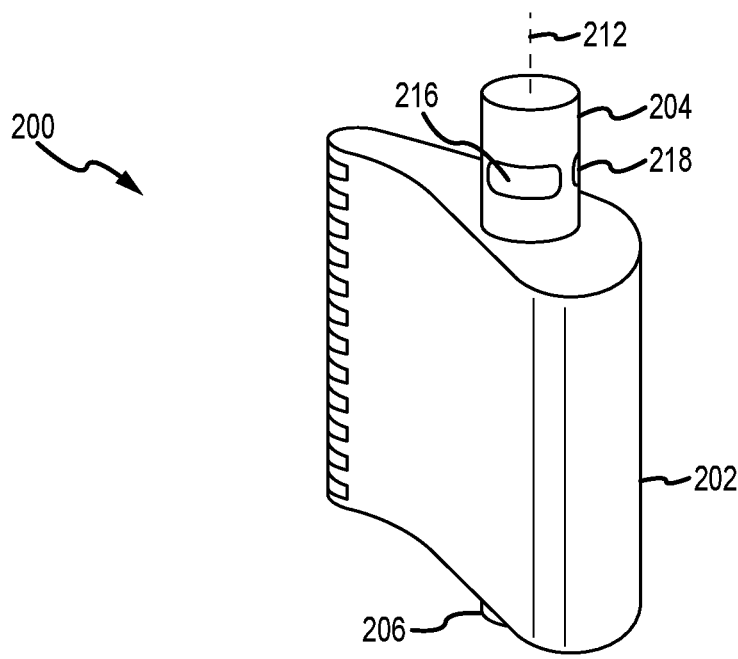
FIGS. 2A and 2B are schematic views of a vane assembly, in accordance with various embodiments.
Figure 2B:
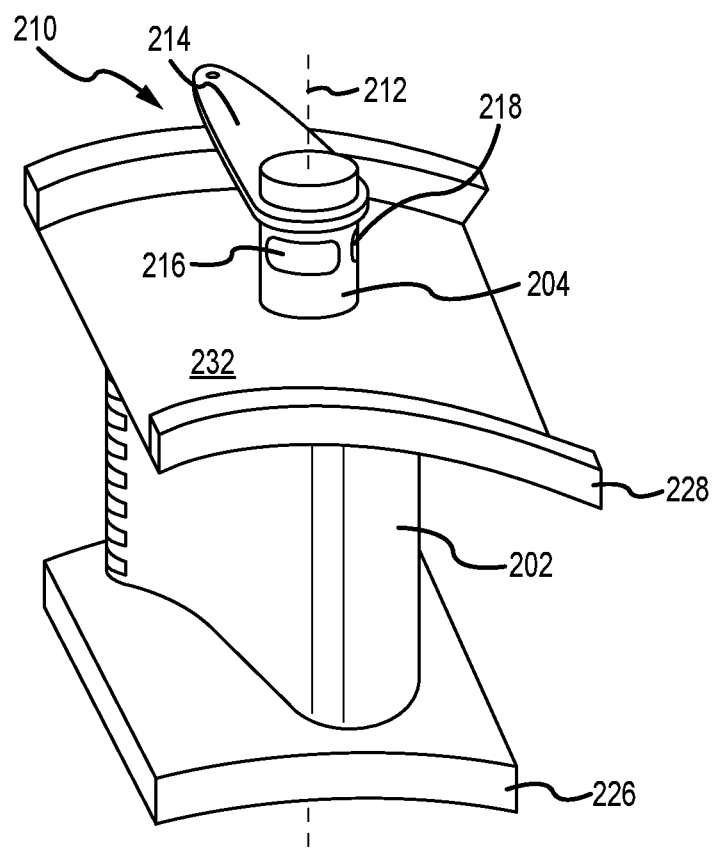
Figure 3A:
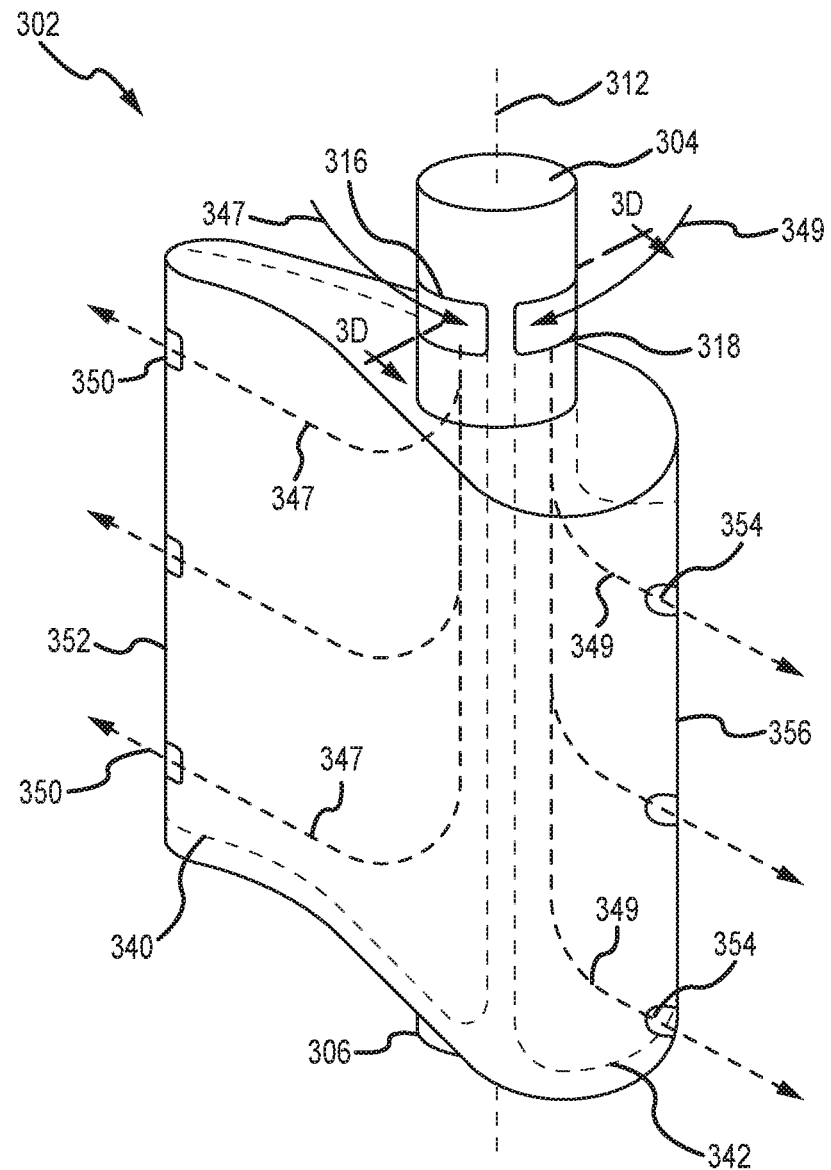
Figure 4A:
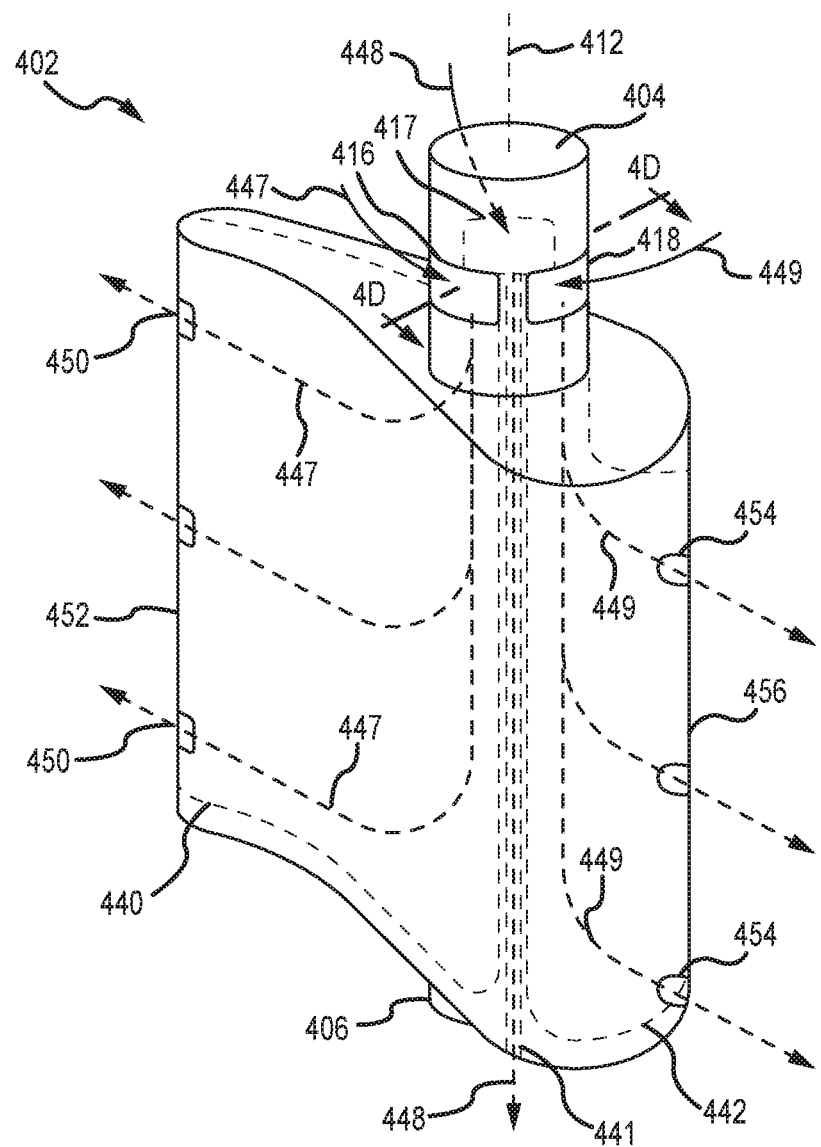

Referring now to FIGS. 2A and 2B, a vane assembly 200 is illustrated, in accordance with various embodiments. In various embodiments, the vane assembly includes a vane 202 in the shape of an airfoil. The vane 202 extends between an outer spindle 204 and an inner spindle 206. The outer spindle 204 extends through an outer vane platform 228, such as, for example, the outer vane platform 128 described above with reference to FIGS. 1B and 1C. Similarly, the inner spindle 206 extends through an inner vane platform 226, such as, for example, the inner vane platform 126 described above with reference to FIGS. 1B and 1C. An actuation system 210 may be configured to rotate the vane 202 about an axis 212 extending through the outer spindle 204 and the inner spindle 206. In various embodiments, the actuation system 210 includes an arm 214 configured to rotate the vane 202 between the inner vane platform 226 and the outer vane platform 228. In various embodiments, the outer spindle 204 includes one or more openings, such as, for example, a first opening 216 and a second opening 218. As described below, the one or more openings are in fluid communication with two or more channels that are configured to route cooling fluid to various regions of the vane 202 or to locations radially inward of the vane 202. In various embodiments, the cooling fluid may comprise bleed air routed from a compressor section and communicated to the one or more openings through a conduit 232, such as, for example, the conduit 132 described above with reference to FIGS. 1B and 1C. In various embodiments, the conduit 232 extends between the outer vane platform 228 and an engine casing structure, such as, for example, the engine casing structure 130 described above with reference to FIGS. 1B and 1C.

Referring now to FIGS. 3A-3D, a vane 302 is illustrated, in accordance with various embodiments. The vane 302 extends between an outer spindle 304 and an inner spindle 306. The outer spindle 304 extends through an outer vane platform, such as, for example, the outer vane platform 128 described above with reference to FIGS. 1B and 1C. Similarly, the inner spindle 306 extends through an inner platform, such as, for example, the inner vane platform 126 described above with reference to FIGS. 1B and 1C. An actuation system, such as, for example, the actuation system 210 described above with reference to FIG. 2B, may be configured to rotate the vane 302 about an axis 312 extending through the outer spindle 304 and the inner spindle 306. In various embodiments, the outer spindle 304 includes one or more openings, such as, for example, a first opening 316 and a second opening 318. The one or more openings are in fluid communication with two or more channels that are configured to route cooling fluid to various regions of the vane 302 or to locations radially inward of the vane 302. In various embodiments, the cooling fluid may comprise bleed air routed from a compressor section and communicated to the one or more openings through a conduit, such as, for example, the conduit 132 described above with reference to FIGS. 1B and 1C. In various embodiments, the conduit extends between an outer platform and an engine casing structure, such as, for example, the outer vane platform 128 and the engine casing structure 130 described above with reference to FIGS. 1B and 1C.

In various embodiments, the first opening 316 is in fluid communication with a first vane cavity 340 and the second opening 318 is in fluid communication with a second vane cavity 342. In various embodiments, a first channel 344 fluidly couples the first opening 316 to the first vane cavity 340 and a second channel 346 fluidly couples the second opening 318 to the second vane cavity 342. The first channel 344 communicates a first cooling fluid flow 347 from the first opening 316 to the first vane cavity 340. In various embodiments, the first cooling fluid flow 347 is routed through the first vane cavity 340 and out one or more trailing edge apertures 350 that are disposed at or proximate a trailing edge 352 of the vane 302. Similarly, the second channel 346 communicates a second cooling fluid flow 349 from the second opening 318 to the second vane cavity 342. In various embodiments, the second cooling fluid flow 349 is routed through the second vane cavity 342 and out one or more leading edge apertures 354 that are disposed at or proximate a leading edge 356 of the vane 302.

In various embodiments, the first opening 316 merges smoothly into the walls or outer boundary that define the first channel 344 such that the resulting first cooling fluid flow 347 is conveyed to the first vane cavity 340 in smooth fashion—e.g., with minimal flow separation or turbulence caused by discontinuities in the walls of the channel. Similarly, in various embodiments, the second opening 318 merges smoothly into the walls or outer boundary that define the second channel 346 such that the resulting second cooling fluid flow 349 is conveyed to the second vane cavity 342 in smooth fashion. In various embodiments, the smooth transition from the openings into the channels and ultimately into the cavities reduces pressure drop due to separated flows and thereby increases the flow rate of cooling fluid.

Referring now to FIGS. 4A-4D, a vane 402 is illustrated, in accordance with various embodiments. The vane 402 extends between an outer spindle 404 and an inner spindle 406. The outer spindle 404 extends through an outer vane platform, such as, for example, the outer vane platform 128 described above with reference to FIGS. 1B and 1C. Similarly, the inner spindle 406 extends through an inner platform, such as, for example, the inner vane platform 126 described above with reference to FIGS. 1B and 1C. An actuation system, such as, for example, the actuation system 210 described above with reference to FIG. 2B, may be configured to rotate the vane 402 about an axis 412 extending through the outer spindle 404 and the inner spindle 406. In various embodiments, the outer spindle 404 includes one or more openings, such as, for example, a first opening 416, a second opening 418 and a third opening 417. The one or more openings are in fluid communication with two or more channels that are configured to route cooling fluid to various regions of the vane 402 or to locations radially inward of the vane 402. In various embodiments, the cooling fluid may comprise bleed air routed from a compressor section and communicated to the one or more openings through a conduit, such as, for example, the conduit 132 described above with reference to FIGS. 1B and 1C. In various embodiments, the conduit extends between an outer platform and an engine casing structure, such as, for example, the outer vane platform 128 and the engine casing structure 130 described above with reference to FIGS. 1B and 1C.

In various embodiments, the first opening 416 is in fluid communication with a first vane cavity 440, the second opening 418 is in fluid communication with a second vane cavity 442 and the third opening 417 is in fluid communication with a third vane cavity 441. In various embodiments, a first channel 444 fluidly couples the first opening 416 to the first vane cavity 440, a second channel 446 fluidly couples the second opening 418 to the second vane cavity 442 and a third channel 445 fluidly couples the third opening 417 to the third vane cavity 441. The first channel 444 communicates a first cooling fluid flow 447 from the first opening 416 to the first vane cavity 440. In various embodiments, the first cooling fluid flow 447 is routed through the first vane cavity 440 and out one or more trailing edge apertures 450 that are disposed at or proximate a trailing edge 452 of the vane 402. Similarly, the second channel 446 communicates a second cooling fluid flow 449 from the second opening 418 to the second vane cavity 442 while the third channel 445 communicates a third cooling fluid flow 448 from the third opening 417 to the third vane cavity 441. In various embodiments, the second cooling fluid flow 449 is routed through the second vane cavity 442 and out one or more leading edge apertures 454 that are disposed at or proximate a leading edge 456 of the vane 402. In various embodiments, the third cooling fluid flow 448 is routed through the third vane cavity 441 and out an orifice extending through the inner spindle 406, from where the third cooling fluid flow 448 is further routed to locations or components radially inward of the vane 402.

In various embodiments, the first opening 416 merges smoothly into the walls or outer boundary that define the first channel 444 such that the resulting first cooling fluid flow 447 is conveyed to the first vane cavity 440 in smooth fashion—e.g., with minimal flow separation or turbulence caused by discontinuities in the walls of the channel. Similarly, in various embodiments, the second opening 418 merges smoothly into the walls or outer boundary that define the second channel 446 such that the resulting second cooling fluid flow 449 is conveyed to the second vane cavity 442 in smooth fashion, while the third opening 417 merges smoothly into the walls or outer boundary that define the third channel 445 such that the resulting third cooling fluid flow 448 is conveyed to the third vane cavity 441 in smooth fashion. In various embodiments, the smooth transition from the openings into the channels and ultimately into the cavities reduces pressure drop due to separated flows and thereby increases the flow rate of cooling fluid.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A gas turbine engine component, comprising:
an airfoil, including therein a first cavity, a second cavity, and a third cavity;
an outer spindle extending from the airfoil, the outer spindle including a first channel in fluid communication with the first cavity, a second channel in fluid communication with the second cavity, and a third channel in fluid communication with the third cavity, the outer spindle further including a first opening in fluid communication with the first channel and a second opening in fluid communication with the second channel, the first and second openings disposed circumferentially about the outer spindle, wherein the first opening extends into a first continuously curved surface configured to merge into a first outer boundary that defines the first channel, the first continuously curved surface extending from the first opening disposed circumferentially about the outer spindle to the first cavity, and wherein the second opening extends into a second continuously curved surface configured to merge into a second outer boundary that defines the second channel, the second continuously curved surface extending from the second opening disposed circumferentially about the outer spindle to the second cavity; and an inner spindle positioned opposite the airfoil of the outer spindle.

2. The gas turbine engine component of claim 1, wherein the first cavity is in fluid communication with one or more trailing edge apertures disposed proximate a trailing edge of the airfoil.

3. The gas turbine engine component of claim 2, wherein the second cavity is in fluid communication with one or more leading edge apertures disposed proximate a leading edge of the airfoil.

4. The gas turbine engine component of claim 1, wherein the outer spindle includes a third opening in fluid communication with the third channel.

5. The gas turbine engine component of claim 4, wherein the third cavity extends through the airfoil and exits through the inner spindle positioned opposite the airfoil of the outer spindle.

6. The gas turbine engine component of claim 1, wherein the airfoil is a vane and at least one of the first opening and the second opening is configured for fluid communication with a conduit configured to supply a cooling fluid flow.

7. The gas turbine engine component of claim 6, wherein the vane is configured to rotate relative to an outer platform.

8. A stator assembly for a gas turbine engine, comprising:
a plurality of vanes disposed circumferentially about an inner platform and an outer platform; and
an engine casing structure disposed radially outward of the outer platform and forming a conduit between the outer platform and the engine casing structure,
wherein a first vane from among the plurality of vanes includes a first outer spindle extending from the first vane and through the outer platform, the first outer spindle including a first channel in fluid communication with a first vane cavity, a second channel in fluid communication with a second vane cavity, and a third channel in fluid communication with a third vane cavity,
wherein the first outer spindle includes a first opening in fluid communication with the first channel and a second opening in fluid communication with the second channel, the first and second openings disposed circumferentially about the first outer spindle,
wherein the first opening extends into a first continuously curved surface configured to merge into a first outer boundary that defines the first channel, the first continuously curved surface extending from the first opening disposed circumferentially about the first outer spindle to the first vane cavity,
wherein the second opening extends into a second continuously curved surface configured to merge into a second outer boundary that defines the second channel, the second continuously curved surface extending from the second opening disposed circumferentially about the first outer spindle to the second vane cavity.

9. The stator assembly of claim 8, wherein the first vane cavity is in fluid communication with one or more trailing edge apertures disposed proximate a trailing edge of the first vane.

10. The stator assembly of claim 9, wherein the second vane cavity is in fluid communication with one or more leading edge apertures disposed proximate a leading edge of the first vane.

11. The stator assembly of claim 8, wherein the first outer spindle includes a third opening in fluid communication with the third channel.

12. The stator assembly of claim 11, wherein the third vane cavity extends through the first vane and exits through the first inner spindle positioned opposite the first vane of the first outer spindle.

13. The stator assembly of claim 8, further comprising a second vane from among the plurality of vanes, the second vane having a second outer spindle extending from the second vane and through the outer platform, the second outer spindle including a third channel in fluid communication with a third vane cavity and a fourth channel in fluid communication with a fourth vane cavity and wherein the second outer spindle includes a third opening in fluid communication with the third channel and a fourth opening in fluid communication with the fourth channel.

14. A gas turbine engine, comprising:
a rotor assembly; and
a stator assembly, the stator assembly comprising:
a plurality of vanes disposed circumferentially about an inner platform and an outer platform; and
an engine casing structure disposed radially outward of the outer platform and forming a conduit between the outer platform and the engine casing structure,
wherein a first vane from among the plurality of vanes includes a first outer spindle extending from the first vane and through the outer platform, the first outer spindle including a first channel in fluid communication with a first vane cavity, a second channel in fluid communication with a second vane cavity, and a third channel in fluid communication with a third vane cavity,
wherein the first outer spindle includes a first opening in fluid communication with the first channel and a second opening in fluid communication with the second channel, the first and second openings disposed circumferentially about the first outer spindle,
wherein the first opening extends into a first continuously curved surface configured to merge into a first outer boundary that defines the first channel, the first continuously curved surface extending from the first opening disposed circumferentially about the first outer spindle to the first vane cavity,
wherein the second opening extends into a second continuously curved surface configured to merge into a second outer boundary that defines the second channel, the second continuously curved surface extending from the second opening disposed circumferentially about the first outer spindle to the second vane cavity.

* * * * *